(12) United States Patent
Bernstein

(10) Patent No.: US 6,450,513 B1
(45) Date of Patent: Sep. 17, 2002

(54) SHOPPING CART ATTACHMENT

(76) Inventor: Michael A. Bernstein, 330 - 9th St. East Suite 102 E, St. Paul, MN (US) 55101

( * ) Notice: Subject to any disclaimer, the term of this patent is extended or adjusted under 35 U.S.C. 154(b) by 0 days.

(21) Appl. No.: 09/774,836

(22) Filed: Jan. 31, 2001

Related U.S. Application Data

(60) Provisional application No. 60/181,018, filed on Feb. 8, 2000.

(51) Int. Cl.[7] .............................................. B62D 39/00
(52) U.S. Cl. .............................. 280/33.99; 280/33.991; 40/308
(58) Field of Search ........................ 40/308; 5/97, 93.1, 5/93.2, 95; 280/33.991, 33.992, 33.993; 180/42

(56) References Cited

U.S. PATENT DOCUMENTS

| | | | | |
|---|---|---|---|---|
| 3,200,786 A | * | 8/1965 | Swezy | 40/612 |
| 4,487,134 A | * | 12/1984 | Foote | 280/33.992 |
| 4,831,956 A | * | 5/1989 | Thater | 40/604 |
| D310,716 S | * | 9/1990 | Trask | D24/34 |
| 5,161,269 A | * | 11/1992 | McLean et al. | 5/93.1 |
| 5,271,634 A | * | 12/1993 | Walton | 280/33.992 |
| 5,398,437 A | * | 3/1995 | Bump, Jr. et al. | 40/604 |
| 5,460,409 A | * | 10/1995 | Conner | 280/749 |
| 5,778,465 A | * | 7/1998 | Myers | 5/93.1 |
| 6,216,374 B1 | * | 4/2001 | Lawrence | 40/604 |

* cited by examiner

Primary Examiner—Cassandra H. Davis
(74) Attorney, Agent, or Firm—Michael S. Sherrill

(57) ABSTRACT

A pliable or rigid web securely suspended across a shopping cart to suspend small, delicate and fragile items above the basket of a shopping cart.

14 Claims, 4 Drawing Sheets

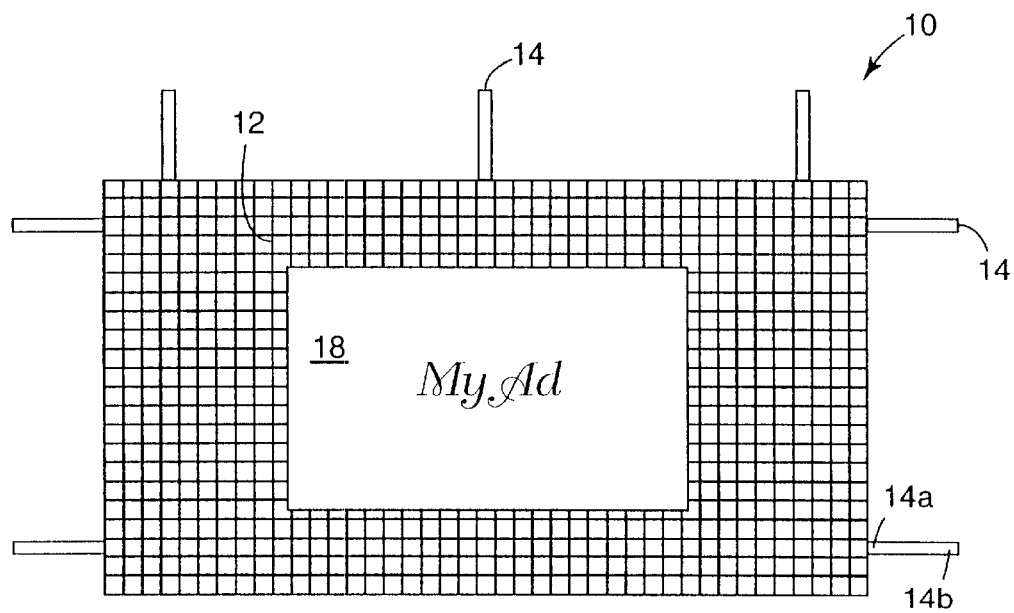
*Fig .1*
*Fig .2*
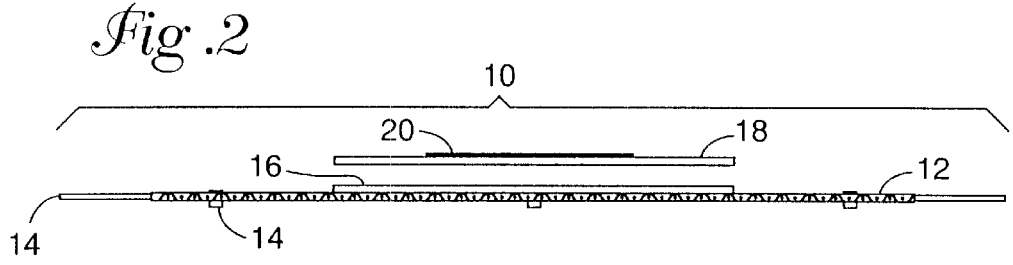
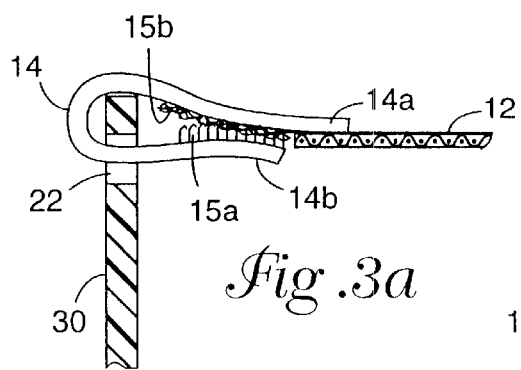
*Fig .3a*
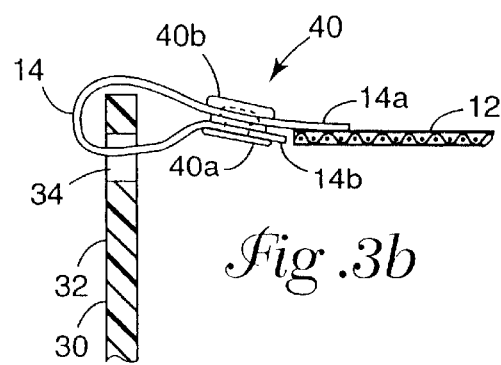
*Fig .3b*

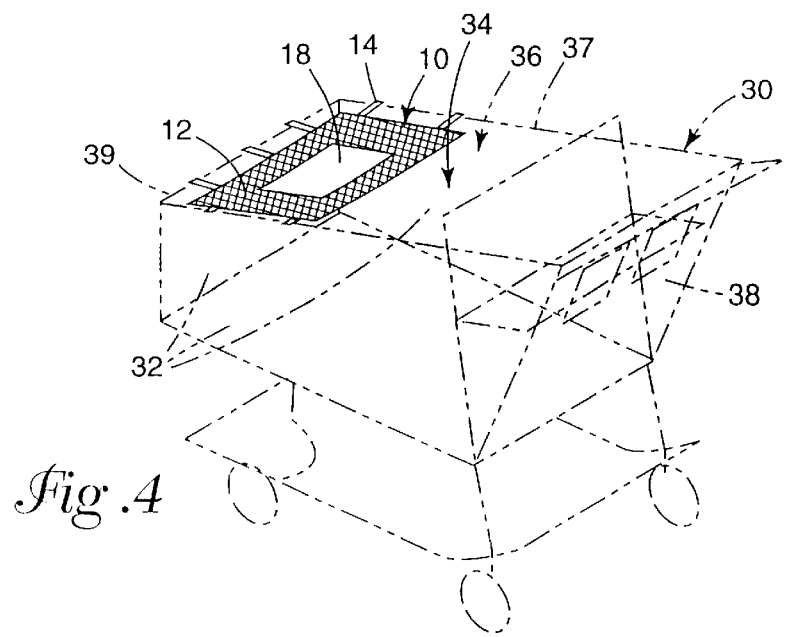
*Fig. 4*
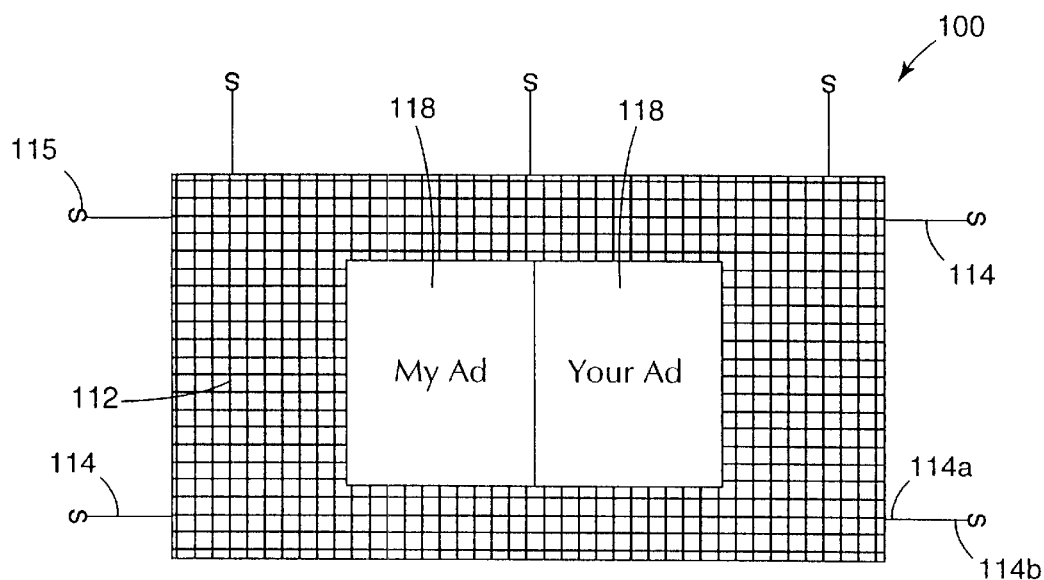
*Fig. 5*
*Fig. 6*
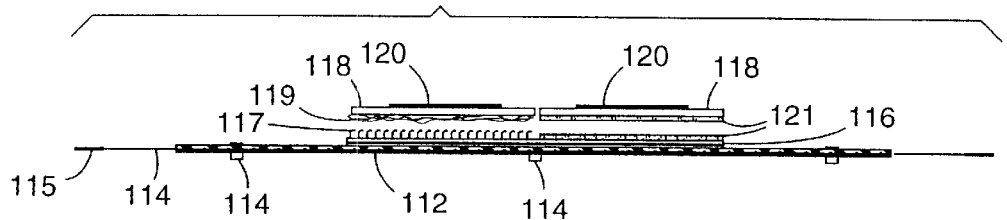

SHOPPING CART ATTACHMENT

This application claims the benefit of United States Provisional Application No. 60/181,018, filed Feb. 8, 2000.

FIELD OF THE INVENTION

The invention relates to shopping cart attachments effective for providing additional carrying capacity and providing an advertising medium.

BACKGROUND

Shopping carts are a fixture of most people's lives and are primarily used when buying numerous. small items, such as groceries, hardware and household items. Many people dread shopping due to the amount of time and inconvenience involved in such a mundane task. This is particularly true in families where both partners work outside the home. Where children are involved the situation is often exacerbated due to the large amount of groceries and household items required. In order to avoid repeated trips to the grocery store persons often "stock up" on groceries and household items. This technique often results in a shopping cart filling to capacity, resulting in damage to delicate or fragile items (e.g., books, breads, china, clay pots, fruits and vegetables, eggs, greeting cards, lightbulbs, potato chips, etc.) at the bottom of the cart. This problem is compounded in grocery stores by the fact that most grocery stores are arranged so that the produce section (e.g., apples, bananas, eggplant, lettuce, tomatoes, etc.) is the first department encountered upon entering the store.

In an effort to eliminate this problem, shoppers often place small, delicate and/or fragile items in the area defined by the folded out child seat built in to most shopping carts. Unfortunately, the seat area possesses leg openings to enable a child to extend his/her legs through. The leg openings allow small items to fall out of the shopping cart. Further problems of a sanitary nature can also exist due to small children inhabiting the seat area.

Finally, any solution to the problem of separating small, delicate and fragile items from more rugged items must be able to accommodate the nesting requirement of modern grocery carts. Nesting allows a plurality of shopping carts to be slid together, as a space saving measure when not being used. Still further, the solution would ideally be able to accommodate replaceable advertising to promote particular manufacturer's products.

Accordingly, a need clearly exists for a device capable of gently retaining small, delicate and fragile items separate and apart from other items within a shopping cart without adversely impacting nestability of the shopping cart or operation of the hinged front wall of a cart, while displaying advertising at the retail location.

SUMMARY OF THE INVENTION

The invention is an attachment for a shopping cart effective for gently retaining small, delicate and fragile items, such as eggs and light bulbs, separate and apart from other items within the shopping cart without adversely impacting nestability of the shopping cart. The attachment is useful within any retail store wherein small, delicate and/or fragile items are sold, including specifically, but not exclusively, craft store, department stores, drug stores, electronics stores, grocery stores, hardware stores, shopping malls, toy stores, wholesale or warehouse clubs, etc. The attachment is particularly well suited for use in connection with a grocery cart. The attachment is a pliant or perforated web configured and arranged for substantially horizontal suspension within the basket of a shopping cart, and a means for securing the web to at least two sidewalls of the shopping cart so as to suspend the web within the basket. In another embodiment, the invention comprises a rigid frame configured and arranged to suspend below the upper edge of the shopping cart basket. The invention contains means for displaying replaceable. advertising to alert the consumer to a particular sponsoring manufacturer's products while at the retail location.

BRIEF DESCRIPTION OF THE DRAWINGS

FIG. 1 is a plan view of an embodiment of the invention.

FIG. 2 is a side view of a cross section of the invention shown in FIG. 1.

FIG. 3a is a side detail view of a first embodiment of a means for attaching the invention to a shopping cart.

FIG. 3b is a side detail view of a second embodiment of a means for attaching the invention to a shopping cart.

FIG. 4 is a perspective view showing an embodiment of the invention attached to a shopping cart.

FIG. 5 is a plan view of a second embodiment of the invention.

FIG. 6 is a side view of a cross section of the second embodiment of the invention Shown in FIG. 5.

DETAILED DESCRIPTION OF THE INVENTION INCLUDING A BEST MODE

Nomenclature

Figure 3C:
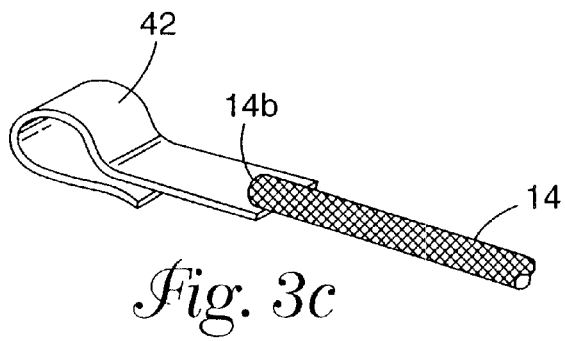
FIG. 3c is a side detail view of a third embodiment of a means for attaching the invention to a shopping cart.
Figure 7:
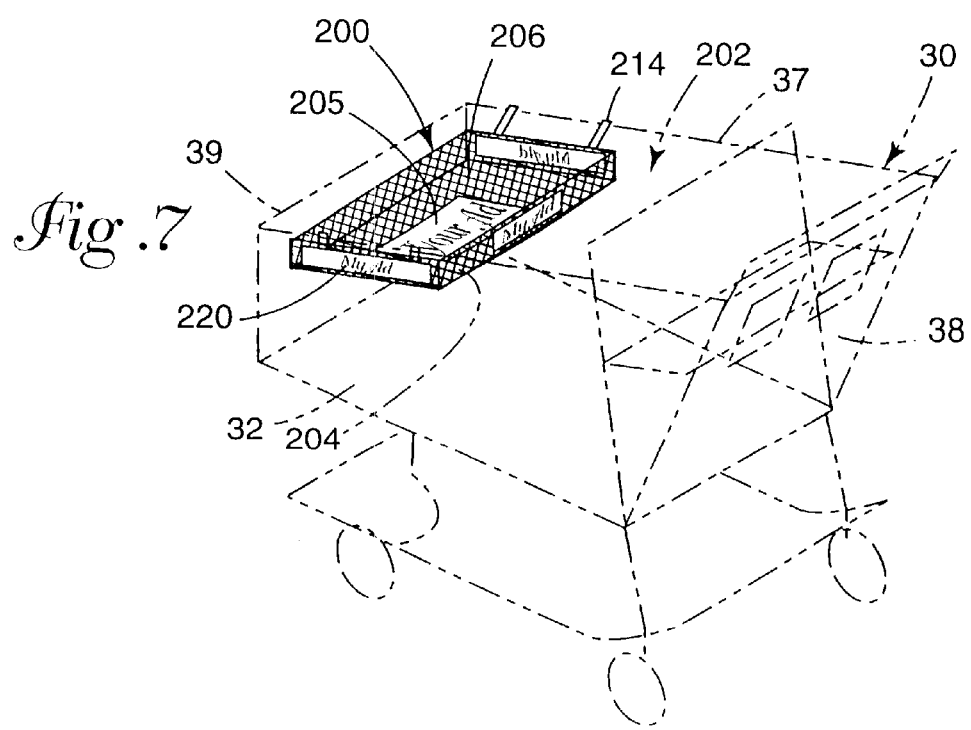
FIG. 7 is a perspective view showing an embodiment of the invention attached to a shopping cart.
Figure 8:
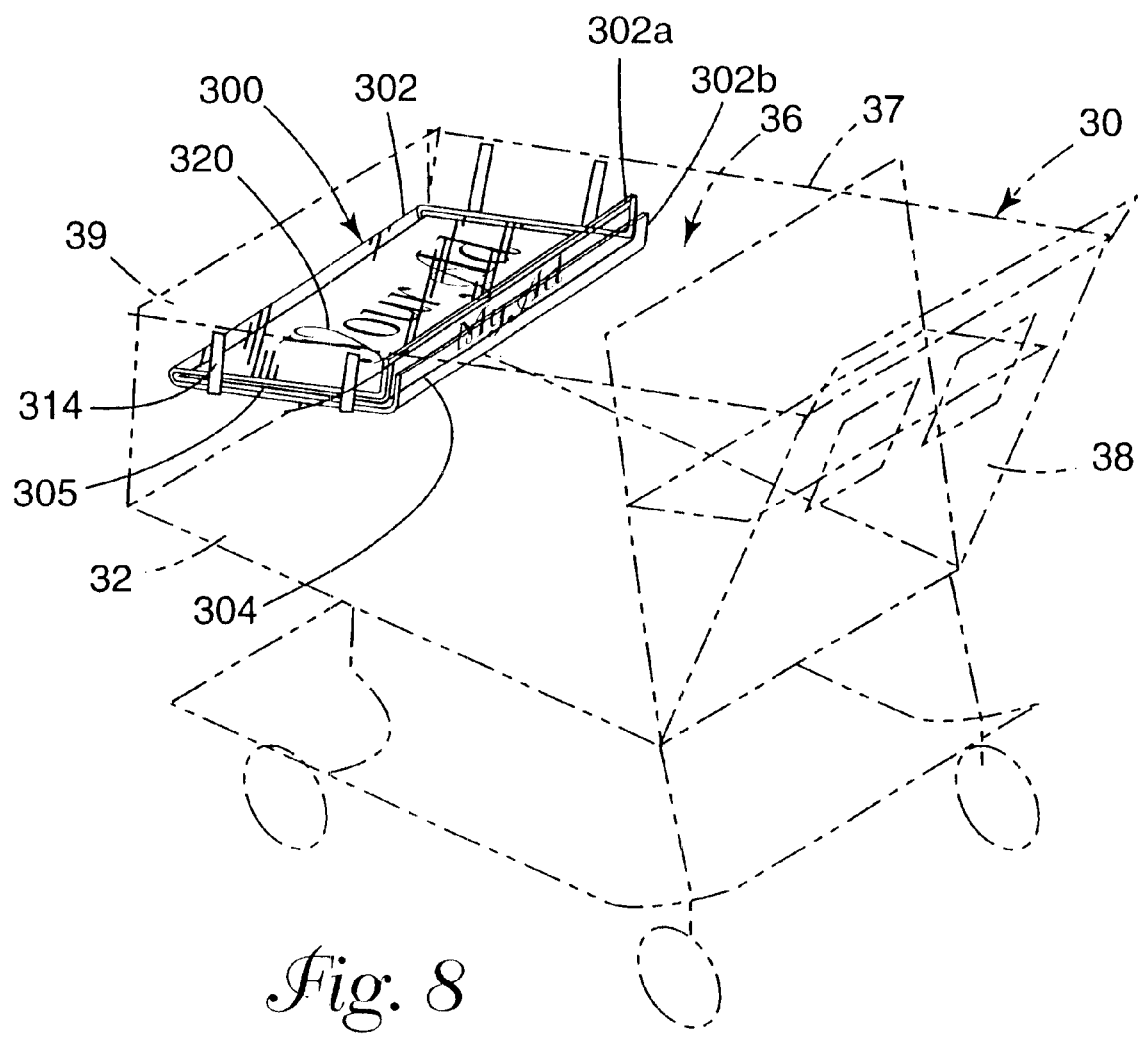
FIG. 8 is a perspective view showing an embodiment of the invention attached to a shopping cart.

10 Shopping Cart Attachment
12 Web
14 Attachment Straps
14b Distal End of Straps
15a Hook Portion of Hook and Loop Tape
15b Loop Portion of Hook and Loop Tape
16 Base Plate
18 Advertising Panel
20 Advertising Indicia
22 Opening in Shopping Cart
30 Shopping Cart
32 Sidewalls of Shopping Cart
34 Opening in Shopping Cart
36 Basket of Shopping Cart
37 Upper Edge of Basket
38 Rear Surface of Basket
39 Front Surface of Basket
40 Snap-Type Fastener
40a Male Snap Half
40b Female Snap Half
42 Spring Clip
44 Snap Fastener
44a Securing Shaft
100 Shopping Cart Attachment
112 Web 114 Elastic Cord
114a Proximal End of Elastic Cord
114b Distal End of Elastic Cord
115 S Hook
116 Base Plate
117 Hook Portion of Hook and Loop Tape
118 Advertising Panel
119 Loop Portion of Hook and Loop Tape
120 Advertising Indicia
121 Adhesive Layer
200 Shopping Cart Attachment
202 Basket
204 Raised Sides
205 Advertising Panel
206 Floor
214 Straps
220 Advertising Indicia
300 Shopping Cart Attachment
302 Frame
302a Upper Frame Half
302b Lower Frame Half
304 Lower Edge of Frame
305 Advertising Panel
314 Straps
320 Advertising Indicia Construction As shown in FIG. 1, the shopping cart attachment 10 comprises a web 12. The web 12 is preferably nylon, but can also be made of other suitable pliable woven, non-woven or perforated materials including natural materials such as sisal, hemp or twine. Other synthetic materials such as rayon, TYVEK®, or any other material able to support a moderate weight will also work. Attached to the web 12 is a plurality of straps 14, 214, 314 or elastic cords 114 in adequate numbers to secure the shopping cart attachment 10, 100, 200, 300 to the sidewalls 32 of a shopping cart 30 as shown in FIGS. 4, 7 and 8. The straps 14, 214, 314 or elastic cords 114 should be attached to at least two sides of the web 12, 112, basket 202 or frame 302 in order to allow the attachment 10, 100, 200, 300 to be fastened to at least two sidewalls 32 of the shopping cart 30 and thereby provide support for the items (not shown) to be placed on the shopping cart attachment 10, 100, 200, 300. As best shown in FIG. 3a, in a preferred embodiment the strap 14 comprises at its distal end 14b nylon webbing having a hook portion 15a and a loop portion 15b of hook and loop tape appropriately positioned along the length of the strap 14. A second embodiment of the strap 14 is shown in FIG. 3b, wherein a snap-type fastener 40 is attached to the distal end of the strap 14b and used to secure the straps 14 to the shopping cart attachment 10, 100, 200, 300. The fastener 40 comprises a male snap half 40a and a female snap half 40b, that can be made of either metal or plastic. Following being looped around an appropriate portion of the shopping cart 30, the male snap half 40a passes through an aperture (unnumbered) in the strap 14 and is received by the female snap half 40b to secure the strap 14 in position. A third embodiment of the strap 14 is shown in FIG. 3c, wherein a spring clip 42 is attached to the distal end 14b of strap 14. The spring clip 42 is positioned around an appropriate portion of the shopping cart 30 for securing the shopping cart attachment 10, 100, 200, 300 to the shopping cart 30. A fourth embodiment of the strap 14 comprises a traditional snap fastener 44 attached to the distal end 14b of the strap 14. The spring biased securing shaft 44a is retracted so as to allow the snap fastener 44 to hook an appropriate portion of the shopping cart 30. Following attachment to the shopping cart 30, the securing shaft 44a is allowed to close, securing the shopping cart attachment 10, 100, 200, 300 to the shopping cart 30.

The web 12, 112, basket 202 or frame 302 should be sized to fit within the opening 34 of the shopping cart 30 with which the attachment 10 is to be used. The attachment 10, 100, can be flexible and loose enough to at least partly conform to the outer contours of the items (not shown) placed upon the web 12. This will assist in preventing items from bouncing out of the attachment 10.

As shown in FIG. 1, an advertising panel 18 can be attached to the web 12. In a preferred embodiment, the advertising panel 18, 118 is removably attached to the web 12, 112 by means of hook-and-loop tape 117, 119 as shown in FIG. 6. In an alternative embodiment, the advertising panel 18, 118 can be removably attached to the web 12, 112 by a magnet. An example of this alternative embodiment is shown in FIG. 2 wherein a base plate 16 is permanently affixed to the web 12, with the advertising panel 18 or the base plate 16 magnetized while the other one is constructed from or contains ferromagnetic particles. In a further alternative embodiment, shown in FIG. 6, the advertising panel 118 may be adhesively secured to a base plate 116 by means of a pressure sensitive adhesive 121 coated onto the advertising panel 118 and/or the base plate 116.

The advertising panel 18, 118, 205, 305 contains advertising indicia 20, 120, 220, 320 on the major surface (unnumbered) facing the customer.

The advertising panels 18, 118, 205, 305 are preferably made of a vinyl material. Vinyl allows printing if desired, as well as good bonding characteristics and flexibility. Other materials, such as formed PLEXIGLASS® with printed paper advertising will also work and is contemplated and within the scope of the invention. Finally, electronically generated messages (not shown) can be incorporated into the advertising panels 18, 118, 205, 305 using liquid crystal display (LCD) or light emitting diode (LED) technology powered by a battery.

A further option for attaching the advertising panel 18, 118, 205, 305 to the attachment 10, 100, 200, 300 comprises the placement of a rigid channel (not shown) on the web 12, 112, basket 202 or frame 302 facing the customer. The channel (not shown) is configured and arranged to allow an advertising panel 18, 118, 205, 305 to be slid into the channel.

By using a releasable means for securing the advertising panel 18, 118, 205, 305 to the attachment 10, 100, 200, 300 the advertising panel 18, 118, 205, 305 may be quickly and easily removed and replaced so as to allow periodic changes in the advertising.

An alternative embodiment of the shopping cart attachment 100 is shown in FIG. 5. In most respects, the construction of the alternative embodiment is similar to the embodiment shown in FIG. 1. Briefly, the shopping cart attachment 100 comprises a; web 112 having at least three sides. The web 112 is preferably nylon, but can also be made of other suitable pliable woven, nonwoven and perforated materials including natural materials such as sisal, hemp or twine. Other synthetic materials such as rayon, TYVEK®, or any other material able to support a moderate weight will also work. Attached to the web 112 is a plurality of elastic cords 114, popularly known as "bungee cords" in adequate numbers to secure the shopping cart attachment 100 to a shopping cart 30. The elastic cords 114 should be attached to at least two sides of the web 112 in order to provide support for items (not shown) to be placed on the shopping cart attachment 100. A proximal end 114a of each elastic cord 114 is permanently attached to the web 112 by any suitable means such as sewing, riveting or gluing (not shown). The distal end 114b of each cord 114 remains free. A releasable fastener, such as an S hook 115 is secured to the distal end 114b of each cord. The S hooks 115 are effective for attaching the shopping cart attachment 100 to the sidewalls 32 of the shopping cart 30. The S hooks 115 may be made of any of the materials conventionally used for such hardware, including metals such as aluminum and steel, and plastics such as ABS and PVC. Other suitable releasable fasteners may also be employed, including. specifically, but not exclusively carabiner-type fasteners (not shown), spring clips 42 and snap fasteners 40.

The web 112 should be sized so as to be smaller than the opening 34 of the shopping cart 30 to which the shopping cart attachment 100 is attached. The shopping cart attachment 100 should be flexible and loose enough to at least partly conform to the outer contours of the items carried. This will prevent the inadvertent bouncing out of items while being wheeled should the shopping cart 30 encounter an inequity on the retail establishment floor. The elastic nature of the elastic cords 114 serves to enhance the shock absorbing and conforming nature of the shopping cart attachment 100.

As shown in FIGS. 5 and 6, advertising panels 118 can be attached to the web 112. The advertising panels 118 contain advertising indicia 120 on the surface facing the customer. In a preferred embodiment, the advertising panel 118 is attached to the web 112 by means of hook and loop tape wherein the loop portion 119 is permanently secured to the advertising panel 118 by a suitable means such as gluing, heat bonding or sewing, and the hook portion 117 permanently secured to the web 112 by similar means. Advertising panel 118 is also shown as removably attached to a base plate 116 by means of a pressure sensitive adhesive 121. It is contemplated and within the scope of the invention to use different fastening systems for independent portions of the advertising panel 118 as shown in FIG. 6.

Another embodiment of the invention is shown in FIG. 7. The shopping cart attachment 200 comprises a basket 202 defined by raised sides 204. The sides 204 are adapted to receive advertising indicia 220 that can be attached by any of the means discussed above. The sides 204 are attached to a floor 206 that is adapted to receive advertising indicia 220 in a similar manner as the sides 204. The sides 204 serve to prevent the selected goods (not shown) from falling into the basket 36 of the shopping cart 30 prior to check out. The shopping cart attachment 200 is attached to the shopping cart 30 via straps 214 by any of the means discussed above.

Yet another embodiment of the invention is shown in FIG. 8. The shopping cart attachment 300 comprises a rigid panel 305 made of a transparent plastic material such as PLEXI-GLASS®. The frame 302 can be either two hinged pieces (not shown), or a single piece formed and folded over so as to define upper 302a and lower 302b frame halves. The ability to separate the upper and lower frame halves permits the replaceable insertion of an advertising panel 305 between the two frame halves 302a, 302b. The frame 302 is optionally provided with raised sides (not shown) so as to prevent the selected goods (not shown) from falling into the basket 36 of the shopping cart 30 prior to check out. The shopping cart attachment 300 is attached to the shopping cart 30 by straps 314 using any of the means discussed above. An alternative version of the embodiment shown in FIG. 8 (not shown) comprises a rigid frame used to support a pliant web 12 similar to that shown in FIGS. 1 and 4. The embodiment of the invention shown in FIG. 8 is advantageous in that it is very compatible with the nesting ability of shopping carts. When shopping carts are nested together for storage, the basket 36 of one cart 30 is inserted through the rear surface 38 of the next shopping cart 30. The rear surface 38 of a shopping cart 30 is typically hinged so as to swing upward to allow nesting. Thus, when nesting occurs, the shopping cart attachment 300 will avoid contacting the raised rear surface 38 of the next forward shopping cart 30, due to its not being flush with the upper edge 37 of the basket 36. Continuing with the nesting process, another shopping cart 30 is inserted into the shopping cart 30 ahead of it. When this occurs, the front surface 39 of the basket 36 will eventually contact the lower edge 304 of the frame 302 that extends below the upper edge 37 of the basket 36. The frame 302 is slightly moved in an upward direction during a nesting situation due to the contact with the shopping cart 30 being inserted. To successful withstand such repeated contacts, it is advantageous that the lower edge 304 of the frame 302 be of a rugged and reinforced nature. It is further advantageous that the lower edge 304 of the frame 302 has a beveled edge (not shown) to assist in the upward movement of the frame 302 during nesting.

Use

To use the shopping cart attachment 10, 100, 200, 300 it must first be attached to a shopping cart 30. As discussed above, the web 12, 112, basket 202 or frame 302 should be smaller than the opening 34 of the shopping cart basket 36 within which the attachment 10 is to be suspended. The attachment straps 14 are held in an extended position such that the hook portion 15a of the hook and loop tape is kept apart from the loop portion 15b of the hook and loop tape disposed on the surface of the attachment straps 14. Using the embodiment shown in FIG. 3a, an attachment strap 14 is placed through an opening 22 in the shopping cart 30 and looped so as to contact the hook 15a and loop 15b portions of the hook and loop tape disposed on the strap 14 and thereby fasten the distal end 14b of the strap 14 to the sidewall 32 of the shopping cart 30. This procedure is then repeated for each of the attachment straps 14 until the shopping cart attachment 10 is attached to the shopping cart 30 with the web 12 horizontally suspended within the basket 36.

Using the embodiment shown in FIG. 3b for fastening the attachment 10 to the shopping cart 30 requires first ensuring that the male 40a and female 40b strap halves are separated. Male 40a and female 40b snap halves are appropriately positioned along the length of the straps 14 so as to allow the straps 14 to be looped around a portion of a sidewall 21 of a shopping cart 30. Following successful looping around of the straps 14, the male 40a and female 40b snap halves are mated and snapped together using hand pressure or a pliers-like tool.

Using the embodiment shown in FIG. 3c requires simply looping the spring clip 42 around an appropriate part of the shopping cart 30 and forcing the clip 42 to eventually spread apart. When the clip 42 is spread sufficiently to permit the clip 42 to encircle the appropriate part of the shopping cart 30, the particular strap or cord 14, 114, 214, 314 is attached.

Figure 3D:
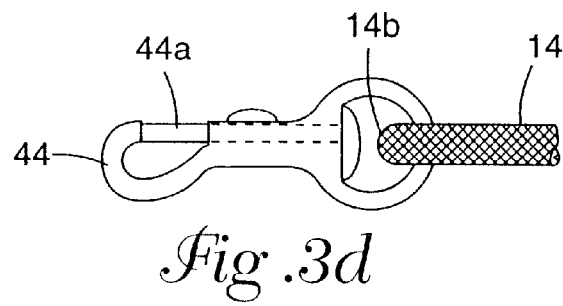
FIG. 3d is a side detail view of a fourth embodiment of a means for attaching the invention to a shopping cart.

Using the embodiment shown in FIG. 3d requires the operator (not shown) to first retract the spring biased securing shaft 44a of the snap fastener 44. When the securing shaft 44a is retracted, the operator is able to hook the snap fastener 44 to an appropriate portion of the shopping cart 30. Following hooking of the snap fastener 44 to the shopping cart 30, the user simply releases the securing shaft 44*a*, which, due to its spring biased nature, retracts back into the closed position, securing the snap fastener 44 and attached strap or cord 14, 114, 214, 314 to the shopping cart 30.

Following attachment of the shopping cart attachment 10, 100, 200, 300 to the shopping cart 30, the advertising panel 18, 118, 205, 305 can be conveniently attached.

With the shopping cart attachment 10, 100, 200, 300 attached to the shopping cart 30, a shopper may simply place small, delicate and fragile goods in the shopping cart attachment 10, 100, 200, 300 where they are safely suspended and separated from any heavy items placed within the basket 36 of the shopping cart 30. This enables the small, delicate and fragile items to be transported to the cashier safely.

What is claimed is:

1. An assembly, comprising:
   (a) a shopping cart having wheels, a handle, and sidewalls defining a basket; and
   (b) an attachment including at least (i) a pliant web, and (ii) means for securing the web to at least two shopping cart sidewalls so as to suspend the web entirely within the basket;
   (c) wherein the attachment is secured to the shopping cart by the securing means with the web horizontally suspended within the basket.

2. The assembly of claim 1 wherein the web is made of nylon.

3. The assembly of claim 1 wherein the securing means comprise a plurality of straps, the straps each having a first end attached to the web and a second end attached to the shopping cart sidewalls.

4. The assembly of claim 3 further comprising hook and loop tape attached to the second end of each of the straps to allow removable attachment and detachment of the straps to the sidewalls.

5. The assembly of claim 4 wherein (i) the hook and loop tape includes a hook portion and a loop portion, and (ii) the straps are each attached to the sidewall by looping the second end of the strap through the sidewall and then allowing the hook portion of the hook and loop tape to contact the loop portion to secure the strap to the sidewall.

6. The assembly of claim 3 further comprising a snap mechanism attached to the second end of each end of the strap to allow removable attachment and detachment of the strap to the sidewall.

7. The assembly of claim 6 wherein the snap mechanism includes a male member and a female member.

8. The assembly of claim 7 wherein each of the straps is attached to the sidewall by looping the second end of the strap through the sidewall and then inserting the male member into the female member to secure the strap to the sidewall.

9. The assembly of claim 6 wherein the snap mechanism is made of plastic.

10. The assembly of claim 6 wherein the snap mechanism is made of metal.

11. The assembly of claim 1 further comprising an advertising panel attached to the web, the advertising panel defining a first major surface containing advertising indicia and a second major surface.

12. The assembly of claim 11 further comprising the advertising panel removably attached to the web.

13. The assembly of claim 12 further comprising a base plate defining a first major surface and a second major surface, the base plate being made of a material having at least some ferromagnetic particles and the advertising panel being made of a magnetized material, allowing the advertising panel to be removably attached to the web upon contact with the base plate.

14. The assembly of claim 12 further comprising a base plate, defining a first major surface and a second major surface, the second major surface contacting and attached to the web, the first major surface of the base plate at least partially covered with a hook portion of hook and loop tape and the second major surface of the advertising panel at least partially covered with a loop portion of hook and loop tape, allowing the advertising panel to be removably attached to the web upon contact with the base plate.

\* \* \* \* \*